United States Patent
Wetterwald et al.

(10) Patent No.: US 9,413,479 B2
(45) Date of Patent: Aug. 9, 2016

(54) INTELLIGENT WIRING IN A LOW POWER AND LOSSY NETWORK

(71) Applicant: Cisco Technology, Inc., San Jose, CA (US)

(72) Inventors: Patrick Wetterwald, Mouans Sartoux (FR); Pascal Thubert, La Colle sur Loup (FR); Vincent J. Ribiere, Biot (FR); Jean-Philippe Vasseur, Saint Martin d'Uriage (FR)

(73) Assignee: Cisco Technology, Inc., San Jose, CA (US)

(*) Notice: Subject to any disclaimer, the term of this patent is extended or adjusted under 35 U.S.C. 154(b) by 85 days.

(21) Appl. No.: 14/155,474

(22) Filed: Jan. 15, 2014

(65) Prior Publication Data

US 2015/0200738 A1    Jul. 16, 2015

(51) Int. Cl.
*H04L 12/40*    (2006.01)
*H04J 3/16*    (2006.01)
*H04W 16/02*    (2009.01)
*H04W 84/10*    (2009.01)

(52) U.S. Cl.
CPC ............... *H04J 3/16* (2013.01); *H04W 16/02* (2013.01); *H04L 2012/40208* (2013.01); *H04W 84/10* (2013.01)

(58) Field of Classification Search
USPC .................................................. 370/442, 254
See application file for complete search history.

(56) References Cited

U.S. PATENT DOCUMENTS

2006/0246935 A1   11/2006  Iochi et al.
2012/0117268 A1    5/2012  Shaffer et al.
2012/0310435 A1*  12/2012  Taft ................................ 700/297
2013/0019005 A1    1/2013  Hui et al.
2013/0031253 A1    1/2013  Hui et al.
2013/0042301 A1    2/2013  Mahamuni et al.
2013/0094537 A1*   4/2013  Hui et al. ....................... 375/134
2013/0250928 A1    9/2013  Choi et al.
2013/0279540 A1   10/2013  Hui et al.

(Continued)

FOREIGN PATENT DOCUMENTS

WO   WO 2006/115577 A1     11/2006
WO   WO2010134974     *    11/2010
WO   WO 2013/031314 A1      3/2013

OTHER PUBLICATIONS 802.11n Next Generation Wireless LAN Technology, Apr. 2006, White Paper, all.*

(Continued)

*Primary Examiner* — Omar Ghowrwal
*Assistant Examiner* — Angel Brockman
(74) *Attorney, Agent, or Firm* — Parker Ibrahim & Berg LLC; James M. Behmke; Kenneth J. Heywood (57) ABSTRACT

In one embodiment, the locations of a plurality of network devices in a low power and lossy network (LLN) are determined along an intelligent wire. One or more neighboring devices for each network device in the plurality are identified based on the locations of the network devices along the intelligent wire. A communication schedule for the network devices is determined that prevents neighboring devices along the intelligent wire from transmitting on the same frequency. The network devices are assigned to communication time slots based on the communication schedule. The network devices are also assigned frequency offsets based on the communication schedule.

23 Claims, 10 Drawing Sheets

(56) References Cited

U.S. PATENT DOCUMENTS

2014/0095864 A1 4/2014 Dasgupta et al.
2014/0129876 A1* 5/2014 Addepalli et al. .............. 714/37
2014/0204757 A1 7/2014 Ishizaki

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

Pister, et al., "Project:IEEE P802.15 Working Group for Wireless Personal Area Networks (WPANs)", IEEE 802.15-08-0582-02-004e, Sep. 2008.

Strickland, J., "Could a Wireless Radio Network Save a Miner's Life?", HowStuff Works: Leaky Feeders, Internet Article: http://electronics.howstuffworks.com/miner-wireless-radio-network1.htm, Printed Mar. 10, 2014, 3 pages, A Discovery Company.

WikiPedia, "Frequency-Hopping Spread Spectrum", Internet Aricle: http://en.wikipedia.org/wiki/Frequency-hopping_spread_spectrum, Jan. 13, 2014, 5 pages, Wikimedia Foundation, Inc.

International Search Report issued Mar. 26, 2015 in connection with PCT/US2015/010789.

Dohler, M. et al.: "Routing Requirements for Urban Low-Power and Lossy Networks; rfc5548.txt", Internet Engineering Task Force, IETF; Standard, Internet Society (ISOC), 4, Rue des Falaises Ch—1205 Geneva, Switzerland, May 1, 2009, pp. 8-10.

Peng Du et al.: "Adaptive time slotted channel hopping for wireless sensor networks", Computer Science and Electronic Engineering Conference (CEEC), 2012 4th, IEEE, Sep. 12, 2012, pp. 29-34.

* cited by examiner

INTELLIGENT WIRING IN A LOW POWER AND LOSSY NETWORK

TECHNICAL FIELD

The present disclosure relates generally to computer networks, and, more particularly, to using intelligent wiring in low power and lossy networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc.

Installing wireless access points (APs) and sensors as part of an LLN can be time consuming and expensive since installation requires experts to both determine where to put these devices and to connect the devices to existing infrastructure, such as existing power lines, Ethernet cables, etc. As more and more uses for LLNs are being deployed, such as in the industrial space (e.g., on a manufacturing floor for process automation and control), determinism of the network communications and their standardization is becoming a primary point of focus within the networking community. In a deterministic network, the time at which a packet will be received by a client device can be scheduled, even if the last network hop is wireless (e.g., using radio, light emitting diodes, etc.). In particular, deterministic networking refers to networks that can guarantee the delivery of packets within a bounded time. Generally, this relates to achieving characteristics such as guaranteed delivery, fixed latency, and jitter close to zero (e.g., micro seconds to tens of milliseconds depending on application). Achieving these characteristics within the architecture of an LLN, however, is not trivial, due to the constrained nature of LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to various embodiments, an "intelligent wire" for use in a wireless network is disclosed herein. According to one or more embodiments of the disclosure, the locations of a plurality of network devices in a low power and lossy network (LLN) are determined along an intelligent wire. One or more neighboring devices for each network device in the plurality are identified based on the locations of the network devices along the intelligent wire. A communication schedule for the network devices is determined that prevents neighboring devices along the intelligent wire from transmitting on the same frequency. The network devices are assigned to communication time slots based on the communication schedule. The network devices are also assigned frequency offsets based on the communication schedule.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
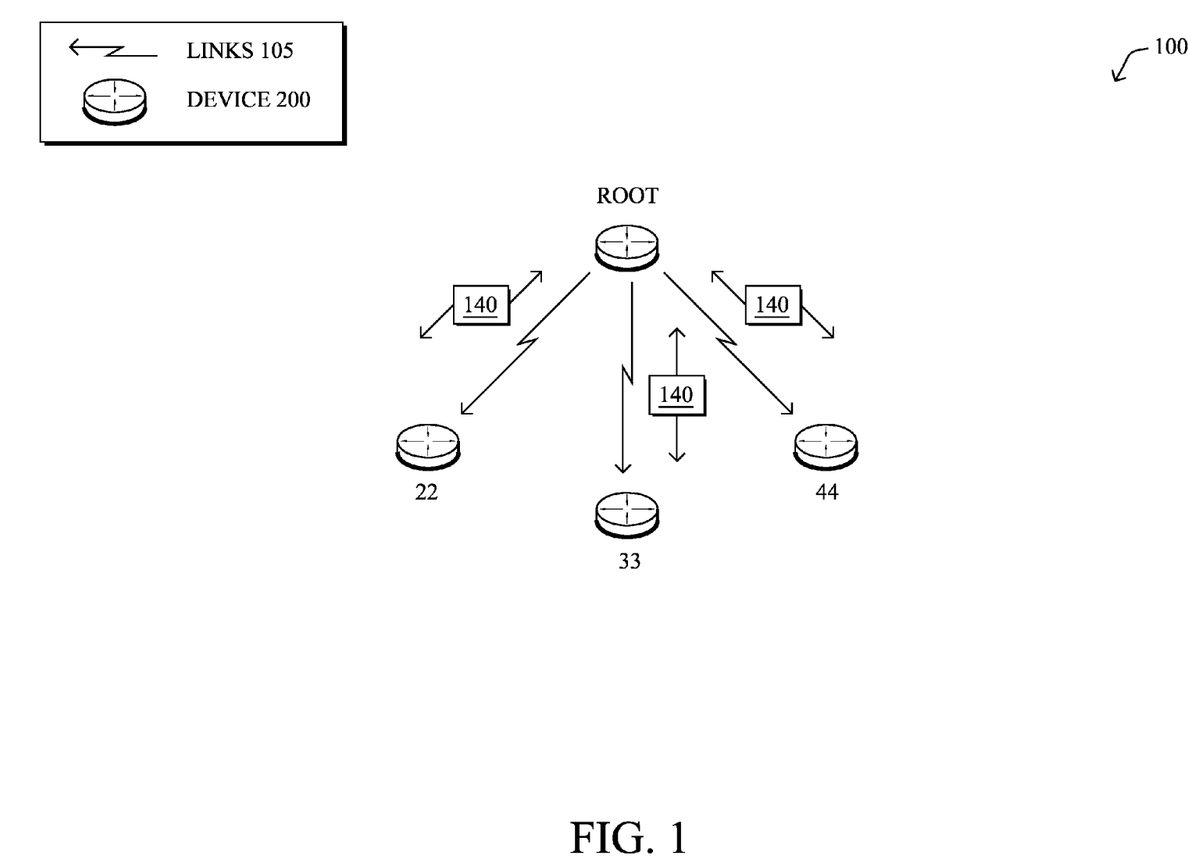
FIG. 1 illustrates an example wireless network.

FIG. 1 is a schematic block diagram of an example (and vastly simplified) computer network 100 (e.g., wireless or otherwise) illustratively comprising nodes/devices 200 (e.g., labeled as shown, 11, 22, 33, and 44) interconnected by frequency-hopping communication links 105, as described below. In particular, certain nodes/devices 200, such as, e.g., routers, sensors, computers, radios, etc., may be in communication with other nodes/devices 200, e.g., based on distance, signal strength, current operational status, location, etc. Those skilled in the art will understand that any number of nodes/devices, links, etc. may be used in the wireless network, and that the view shown herein is for simplicity (particularly, that while routers are shown, any wireless communication devices 11, 22, 33, 44 may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc., sent between the devices/nodes) may be exchanged among nodes/devices 200 of computer network 100 using predefined network communication protocols such as certain known wireless protocols (e.g., IEEE Std. 802.15.4, WiFi™, Bluetooth®, etc.) or other shared media protocols where appropriate (e.g., PLC, TCP/IP, etc.). As described herein, the communication may be based on a frequency-hopping protocol. In this context, a protocol consists of a set of rules defining how the nodes interact with each other.

Figure 2:
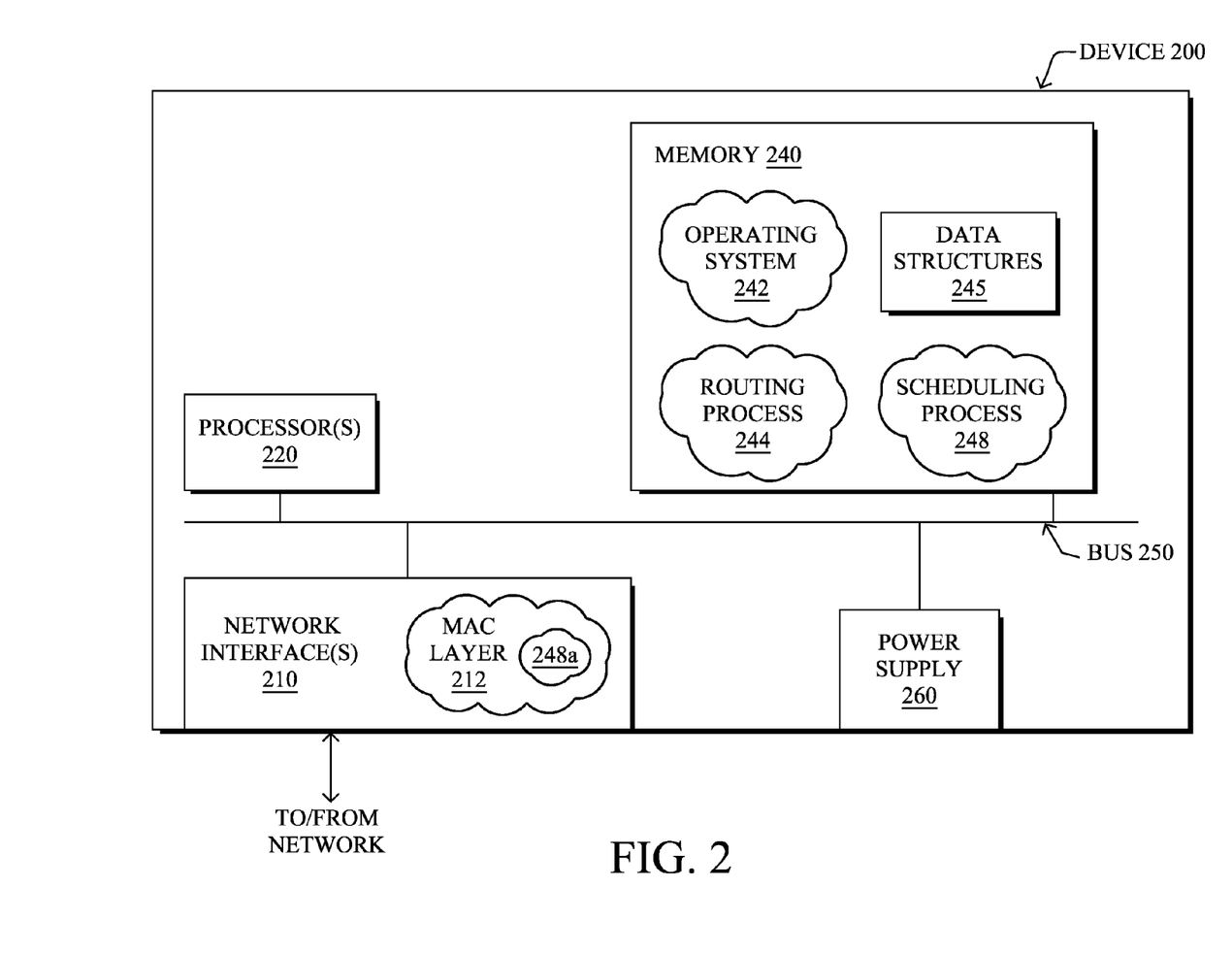
FIG. 2 illustrates an example wireless device/node.

FIG. 2 is a schematic block diagram of an example node/device 200 that may be used with one or more embodiments described herein, e.g., as nodes 11, 22, 33, or 44. Device 200 may comprise one or more network interfaces 210 (e.g., wireless/frequency-hopping), at least one processor 220, and a memory 240, interconnected by a system bus 250, as well as a power supply 260 (e.g., plug-in, battery, etc.).

Network interface(s) 210 (e.g., transceivers or simply "radios," photoreceptors/light sources, etc.) include the mechanical, electrical, and signaling circuitry for communicating data over wireless links 105 in network 100. Network interface(s) 210 may be configured to transmit and/or receive data using one or more different communication protocols as noted above, and as will be understood by those skilled in the art, particularly for frequency-hopping communication as described herein. In addition, network interfaces 210 may comprise an illustrative media access control (MAC) layer module 212 (and other layers, such as the physical or "PHY" layer, as will be understood by those skilled in the art). Nodes/devices 200 may also have one or more different types of network interface(s) 210, namely, wireless and wired/physical connections (e.g., via an intelligent wire), and that the view herein is merely for illustration. Also, while network interface 210 is shown separately from power supply 260, for PLC network interface 210 may communicate through power supply 260, or may be an integral component of power supply 260. In some specific configurations the PLC signal may be coupled to the power line feeding into the power supply.

Memory 240 comprises a plurality of storage locations that are addressable by processor 220 and network interface 210 for storing software programs and data structures associated with the embodiments described herein. Note that certain devices may have limited memory or no memory (e.g., no memory for storage other than for programs/processes operating on the device). Processor 220 may comprise necessary elements or logic adapted to execute the software programs and manipulate data structures 245. An operating system 242, portions of which are typically resident in memory 240 and executed by processor 220, functionally organizes device 200 by, inter alia, invoking operations in support of software processes and/or services executing on device 200. These software processes and/or services may comprise routing process/services 244 and an illustrative scheduling process 248 as described in greater detail below. Note that while scheduling process 248 is shown in centralized memory 240, alternative embodiments provide for the mode selection process to be specifically operated within network interface 210, such as a component of MAC layer 212.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by processor 220 to perform functions provided by one or more routing protocols, such as proactive or reactive routing protocols, as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs may be comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows, window shades, blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) for use in routing data transmissions 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 3:
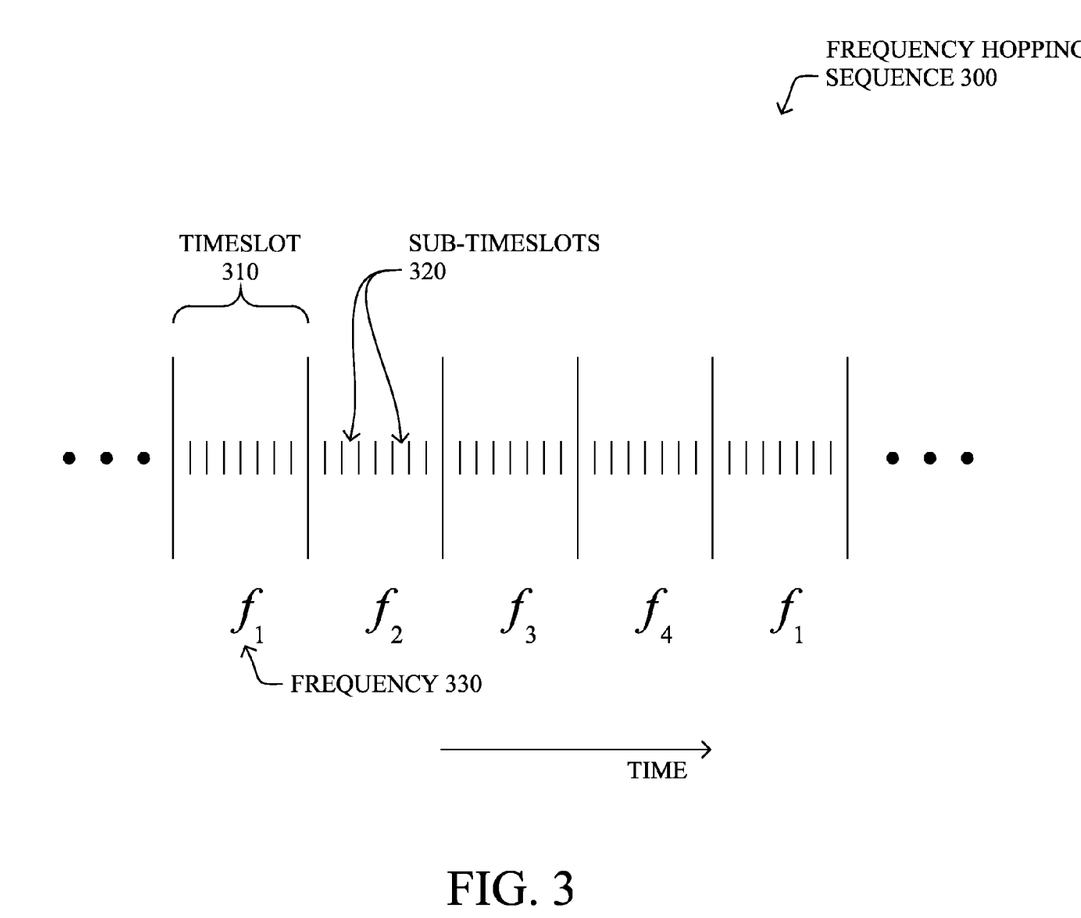
FIG. 3 illustrates an example frequency-hopping sequence.

In general, as shown in FIG. 3, in frequency-hopping wireless networks, time frames are divided within a frequency-hopping sequence 300 into regular timeslots 310, each one operating on a different frequency 330 (e.g., f1-f4). A reference clock may be provided for the time frames for an entire network (e.g., mesh/cell), or at least between pairs of communicating devices. MAC layer 212 of each device 200 divides time into timeslots that are aligned with the timeslot boundary of its neighbor. Also, each timeslot 310 may be further divided into sub-timeslots 320. However, not all frequency-hopping systems use sub-timeslots, and devices can begin transmission at any time within a timeslot. The view herein is merely one example. Illustratively, MAC layer 212 is in charge of scheduling the timeslot 310 in which a data transmission 140 is sent, the main objective of which generally being the determination of transmission times in order to avoid collisions with neighbors' transmissions. MAC layer 212 must not only schedule the data transmissions 140 coming from upper layers of a protocol stack, but it also must schedule its own data transmissions 140 (e.g., acknowledgements, requests, beacons, etc.).

A device 200 in the frequency-hopping network configures its receiver to follow a hopping schedule by picking or being assigned a channel sequence, duration of each time slot, and time base that defines when the first slot in the schedule begins. To then communicate a packet, the transmitter and receiver must be configured to the same channel during the packet transmission using a common network communication schedule. For example, a path computation engine (PCE) may generate a time-slot and channel-hopping (TSCH) schedule, in accordance with the IEEE 802.15.4e protocol or another such protocol. The time-slotted aspect of the TSCH technology is a time division multiplexing (TDM) technique, which requires all nodes in the network to be time synchronized. Time is sliced up into time slots with a given time slot being long enough for a MAC frame of maximum size to be sent from a first device to a second device (e.g., from mote B to mote A), and for the receiving device (e.g., mote A) to reply with an acknowledgment (ACK) frame indicating successful reception.

TSCH is different for traditional low-power MAC protocols because of its scheduled nature, allowing for the deterministic delivery of packets to nodes. In contrast to FHSS, for example, where transmission times are simply randomized, TSCH orchestrates the transmission times to avoid collisions. All nodes in the network follow a common communication schedule which indicates, for each active (transmit or receive) timeslot, a channel offset and the address of the neighbor with which the device is to communicate. The channel offset is translated into a frequency using a specific translation function which causes pairs of neighbors to hop between the different available frequencies when communicating. Such channel hopping technique efficiently combats multi-path fading and external interference.

Figure 4A:
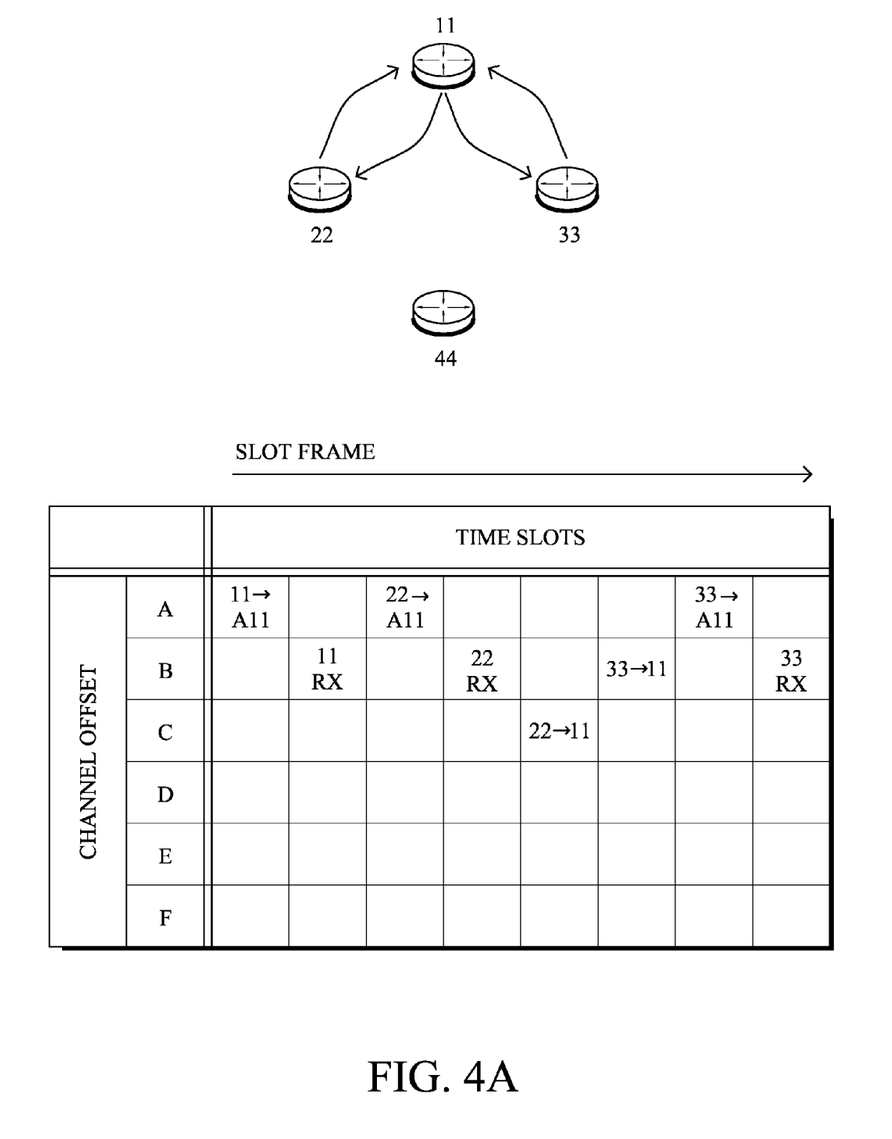
FIGS. 4A-4C illustrate an example of a time slotted, frequency-hopping schedule being generated.
Figure 4B:
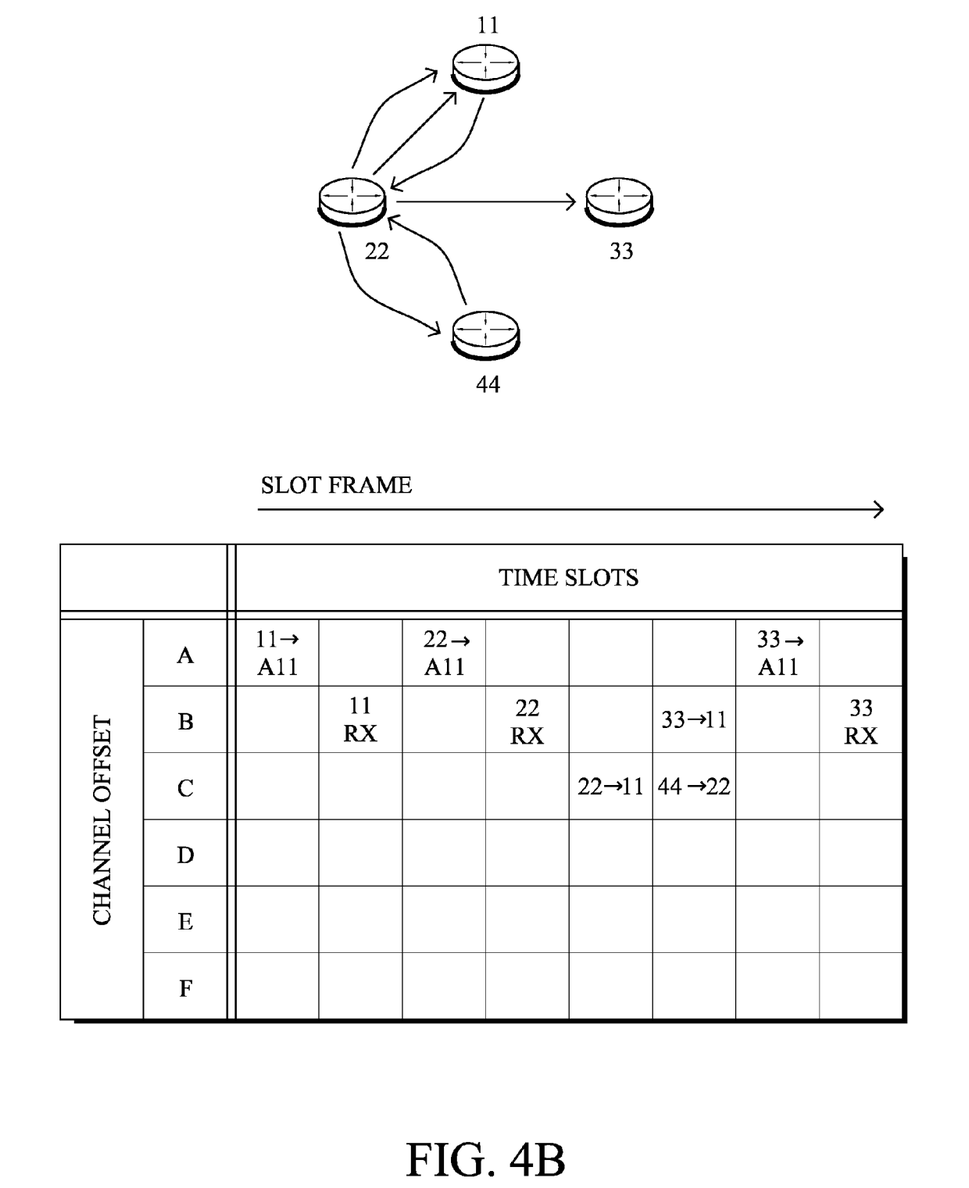
Figure 4C:
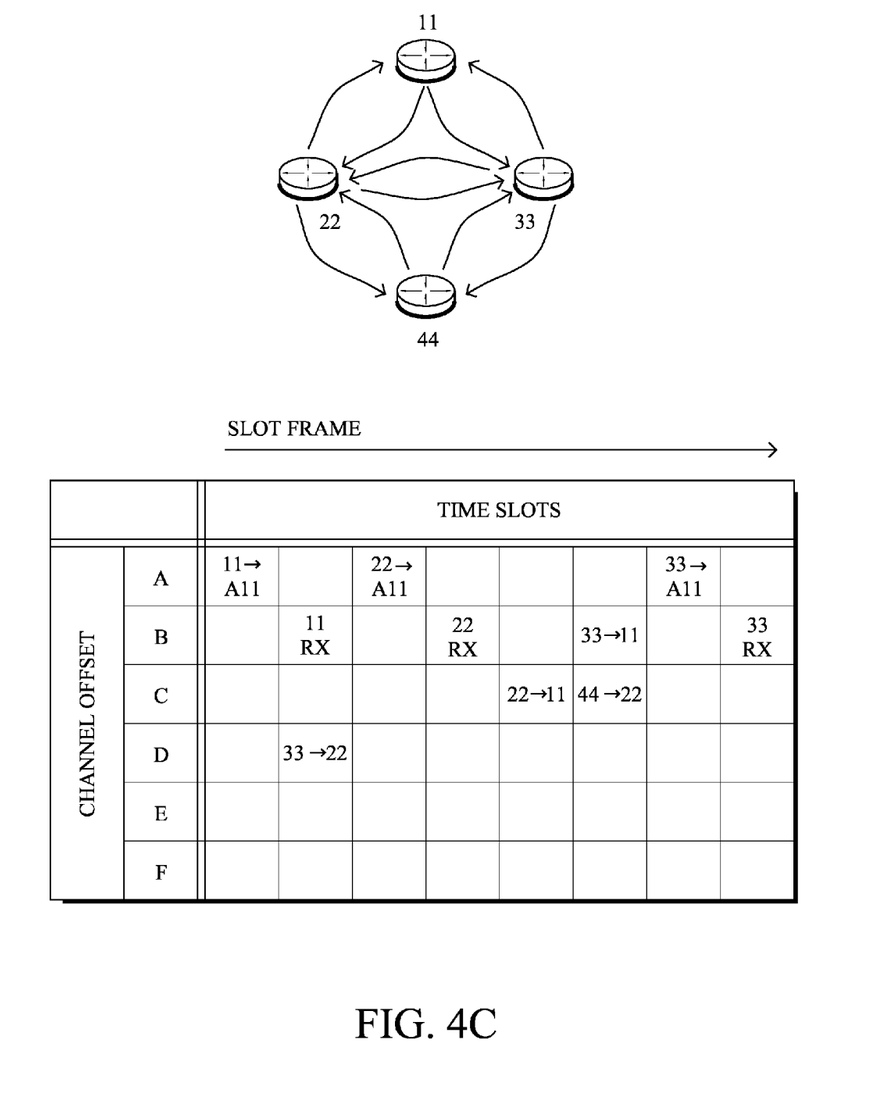

An example of the generation of a time slotted, frequency-hopping schedule is shown in FIGS. 4A-4C. As the communication schedule is built, transmissions and receptions performed by each network device (e.g., devices/nodes 11, 22, 33, and 44) are assigned to time slots and channel offsets. In the simplified example shown, the schedule may use a time frame divided into eight time slots and six channel offsets (e.g., channel offsets A-F). Different combinations of time slots and channel offsets may be used in other implementations.

In FIG. 4A, node/device 11 acts as a PCE that initiates the generation of the communication schedule for the network by advertising an invitation to join the network to all available devices. In response to receiving the network invitation advertised by node/device 11, node/device 22 responds with a request to join the network. Based on the join request, node/device 11 assigns node/device 22 to different frequencies and time slots for broadcast transmission, message reception, and a unicast transmission to node/device 11. This process is repeated by node/device 11 and node/device 33 in subsequent frames to assign time slots and frequencies to node/device 33 for purposes of sending broadcast messages, unicast messages to node/device 11, and receiving messages.

In FIG. 4B, node/device 22 advertises an invitation to node/devices 33 and 44 in a subsequent frame. In the current example, node/device 44 has limited functionality and may not be configured to expand the network. Node/device 44 responds with a request to join the network, which is forwarded by node/device 22 back to node/device 11. In response, node/device 11 assigns communications from node/device 44 to node/device 22 to a corresponding time slot and frequency.

In FIG. 4C, the process continues on in further frames to establish a channel and frequency for communications from node/device 44 to node/device 33, thereby completing the communication schedule for the devices. Thus, communications between the devices are deterministic in that the devices transmit or receive messages at specific times and at specific frequencies.

As noted above, deployment of a deterministic LLN requires achievement of characteristics such as guaranteed delivery, fixed latency, and jitter close to zero (e.g., microseconds to tens of milliseconds depending on application). Achieving these characteristics within the architecture of an LLN, however, is not trivial, due to the constrained nature of LLNs.

Intelligent Wiring in an LLN

The techniques herein provide a mechanism whereby LLN devices are coupled to, or embedded on, an "intelligent wire" (described below) at known locations along the wire. As used herein, an intelligent wire generally refers to a physical wire that has embedded devices (e.g., APs, sensors, etc.) at known locations/distances along the wire. For example, the intelligent wire may incorporate WiFi™ access points (APs), sensors APs, light emitting diode (LED) APs, or other network devices, at well-paced intervals along the wire, allowing a non-technician to deploy a network infrastructure in a building or in an area. Since the device locations along the wire are known, the deployment locations of the devices are also easily determined (e.g., a first AP is located eight feet from a given wall, a second AP is located sixteen feet from a given wall, etc.). Additionally, the techniques herein provide a packet scheduling mechanism that utilizes the physical locations of network devices along the intelligent wire to generate a communication schedule, such as a TSCH schedule, thereby minimizing interference between neighboring devices along the wire. Specifically, according to one or more embodiments of the disclosure as described in detail below, the locations of a plurality of network devices in an LLN are determined along an intelligent wire. One or more neighboring devices for each network device in the plurality are identified based on the locations of the network devices along the intelligent wire. A communication schedule for the network devices is determined that prevents neighboring devices along the intelligent wire from transmitting on the same frequency. The network devices are assigned to communication time slots based on the communication schedule. The network devices are also assigned frequency offsets based on the communication schedule.

Illustratively, the techniques herein may be performed by hardware, software, and/or firmware, such as in accordance with scheduling process 248 and/or MAC layer module 212, which may each include computer executable instructions executed by a processor (e.g., processor 220 or an independent processor within the network interface 210) to perform functions relating to the techniques described herein, such as, e.g., as part of a frequency hopping communication protocol. For example, the techniques herein may be treated as extensions to conventional wireless communication protocols, such as the IEEE 802.11 protocol, IEEE 802.15.4, WiFi™, etc., and as such, would be processed by similar components understood in the art that execute such protocols.

Figure 5:
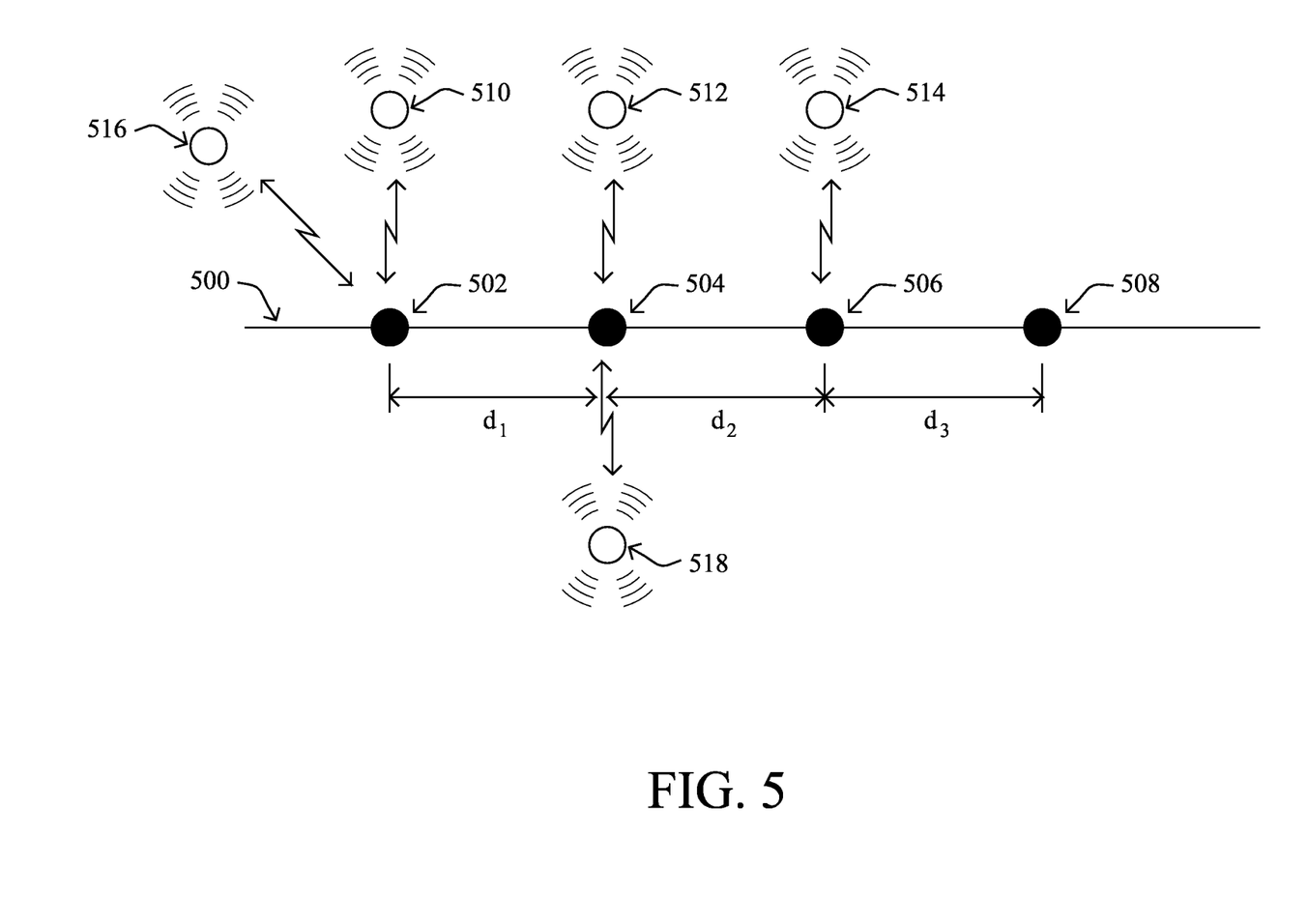
FIG. 5 illustrates an example intelligent wire.

Operationally, the techniques herein allow LLN devices (e.g., sensor APs, WiFi™ APs, LED APs, sensors, etc.) to be embedded in an "intelligent cable" deployed in an office building, such as on the ceiling, floor, or walls. The cable may be sold by the meter or any other length and contain a high density of APs/sensors which are spread at fixed and known distance from each other. For example, as shown in FIG. 5, an example intelligent wire 500 is shown having embedded network devices 502-508 at fixed intervals. In other words, network devices 502-508 are separated by known distances d1-d3, allowing network devices 502-508 to be easily located along intelligent wire 500.

Network devices 502-508 may be APs that enable remote communications with devices 510-518. For example, network devices 502-508 may transmit and/or receive data from devices 510-518 via radio signals or LED emissions. As will be appreciated, the devices 510-518 are illustrative and that any number of devices may communicate with network devices 502-508 on a one-to-one or one-to-many basis. In general, APs in LLNs are very low-power and the power is adjusted automatically by the network. A similar process may be used for LED APs to monitor the light emission power in systems that use light as the media link between devices. Devices 510-518 may, in some cases, be located along one or more other intelligent wires in the deployment area. In other words, multiple intelligent wires containing network devices may be deployed in a 2D or 3D grid throughout the deployment area.

In one embodiment, a high density of network devices 502-508 is positioned along intelligent wire 500. For example, distances $d_1$-$d_3$ may be selected such that network devices 502-508 have overlapping coverage areas in relation to devices 510-514 (e.g., intelligent wire 500 includes a high density of APs/sensors). Thus, maintenance of intelligent wire 500 is minimal since the APs/sensors do not need to be replaced when faulty thanks to their high density. In some cases, intelligent wire 500 may be configured to relay diagnostic data to a supervisory device. In the event of a faulty network device being detected along intelligent wire 500, the supervisory device may increase the power of the APs neighboring the faulty AP to compensate for the loss of coverage by the faulty device.

Intelligent wire 500 may provide a wired communication medium between network devices 502-508. For example, intelligent wire 500 may provide Ethernet connectivity between network devices 502-508. In the case of high bandwidth APs, this will reduce the maximum length of the cable. To increase the length of intelligent wire 500, Ethernet extenders may be used. Ethernet extenders now can reach a mile long at 100 Mbps with power over Ethernet (POE) supported. In the case where network devices 502-508 are 802.15.4 APs, much longer distances may be reached as the AP bandwidth is limited. In another example, intelligent wire 500 may provide a time slotted bus which, like in the case of 802.15.4, the bandwidth of intelligent wire 500 is one order of magnitude more than the APs along the cable. This is also consistent with the light as a service (LaaS) approach whereby lighting is actually provided through Ethernet/PoE.

Regarding the installation of intelligent wire 500, intelligent wire 500 may be configured for installation on the ceiling, floor, walls, or other support structures in a deployment area. For example, intelligent wire 500 may be molded out of a flat vinyl-like material, with a profile that can snap right over the grids of a suspended ceiling. If an AP is located every 8, 12, or 16 feet, etc., they will fall on the X intersections between the ceiling panels. For outdoor installations, the wire and APs can be integrated into long, horizontal building materials like gutters, fences, window transoms, or the facade elements used is places like stadiums. The weight of the embedded APs in intelligent wire 500 will be very low and will not significantly impact the deployment. The AP antennae may also be integrated into intelligent wire 500 and may be directional or omnidirectional. If so, intelligent wire 500 may be installed with only a bottom up indicator or other label to direct the installer.

At one or both ends of intelligent wire 500 may be an Ethernet access switch, Ethernet extenders, or other such networking components. In the case of Ethernet, installation may entail simply cutting intelligent wire 500 to the desired length and adding a RJ45 connector to an end of the wire. If intelligent wire 500 is of sufficient length, a repeater may be added along the line. Intelligent wire 500 may also terminate at a network switch that can also operate as a wireless controller. In such cases, network devices 502-508 along intelligent wire 500 may be IP addressable APs. MAC/Phy operation may thus be performed wirelessly by the switch or on a very limited basis over intelligent wire 500.

As noted above, use of an intelligent wire having integrated network devices allows the location of each network device along the wire to be easily identified, since the network devices are positioned at known points along the wire. The known distances between the devices, as well as unique identifiers for the devices, allow a supervisory node/device to determine the physical location of the devices along the intelligent wire. In one embodiment, the position of a device along the intelligent wire is determined using a sequence number written when the wire is manufactured. In another embodiment, each device along the wire may be assigned a sequential serial number during installation. Using a sequence of such device identifiers allows the wire to be of any length and can be cut at any point, while still allowing the positions of the devices to be easily identified. In other words, the physical location of a device on the intelligent wire can be computed using the sequence number of the device and the known distances of the devices along the wire. For example, if each device 502-508 is spaced by a distance d along intelligent wire 500 and the sequence number of an AP along the wire indicates that the AP is the third device along the wire (e.g., device 506), the location of the AP can be computed as 3*D relative to one end of the wire.

In some embodiments, the positions of the network devices along the intelligent wire may be used to generate a communication schedule for the devices in the network. For example, the positions of the network devices along an intelligent wire may be used to implement a TSCH communication schedule. As noted above, TSCH describes a way to use time slotting and channel hopping to schedule the emission and delivery of a packet between two nodes in a network, such as a wireless sensor network. In the example shown in FIG. 6, intelligent wire 500 may be used to add a new dimension to a TSCH table based on the relative positions of the APs along intelligent wire 500 (i.e., network devices 502-508). As the location of each AP is known, a schedule coordination device (e.g., a PCE or other device) may be configured to generate a communication schedule for the APs such that any adjacent APs do not emit on the same frequency. As the emission power is reduced to the minimum working level, the amount of interference between devices is thereby limited.

Regulating emission power of APs along an intelligent wire differs sharply from existing techniques, such as using leaky feeder coaxial cables. In general, leaky feeder coax is a radio technology used for years to reach devices in tunnels or mines but the basic principle is to "increase" the emission power and the coverage of the radio by mostly acting directly on the antennae. The techniques disclosed herein do the opposite, i.e., limiting the power emission of each of the network devices on the wire to the minimum level needed to communicate with the other devices. In other words, the wireless resource is optimized. In some cases, all APs on the intelligent wire are active resources, such as uniquely addressable Layer 2 or 3 devices having RF or light-based outputs that can be managed individually.

Figure 6:
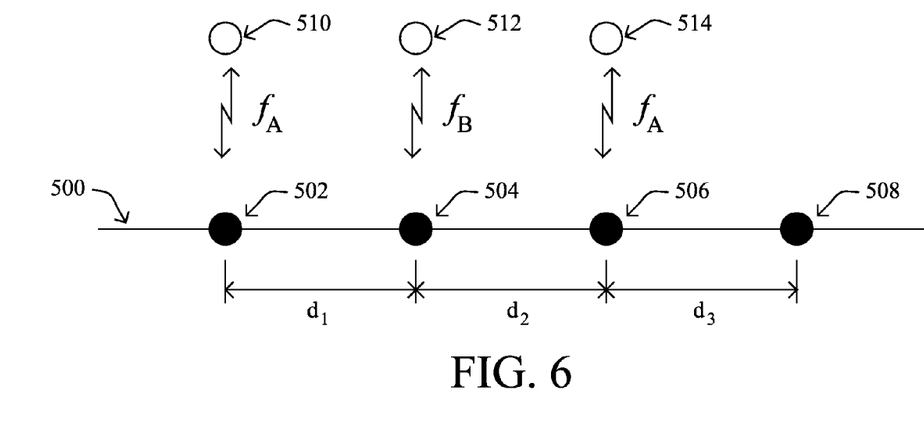
FIG. 6 illustrates an example of frequencies being assigned along the intelligent wire.

As shown in FIG. 6, a network node/device operating as a scheduling device may determine, for each of the network devices 502-508 along intelligent wire 500, the locations of the devices. For example, a scheduling device at one end of intelligent wire 500 may receive sequence numbers or other identifiers for device 502-508. In response, the scheduling device may determine the physical locations of devices 502-508 relative to one another. Based on the locations, the scheduling device may identify one or more neighbor devices for each of the network devices 502-508. For example, the scheduling device may determine that device 506 is neighbored by devices 504 and 508. In one embodiment, the scheduling device may also use the location and neighbor information to assign channel offset frequencies to network devices 502-508. For example, the scheduling device may assign one channel offset ($f_B$) to network device 504 than to its neighbor devices 502, 506, which use a different channel offset ($f_A$). The scheduling device or another such network controller may also control the emission power of network devices 502-508 based on the relative locations of the network devices. Accordingly, interference between network device 504 and its neighboring devices 502, 504 may be reduced.

In cases in which intelligent wire 500 is used for factory automation and network devices 502-508 are 802.15.4 APs, the cost of intelligent wire 500 will be greatly reduced in comparison to WiFi™,. The emission power used in intelligent wire 500 is also reduced, thereby minimizing the power consumed by intelligent wire 500. A similar approach may be taken in intelligent wire 500 if network devices 502-508 are LED AP, to limit the power consumption of the APs.

Figure 7:
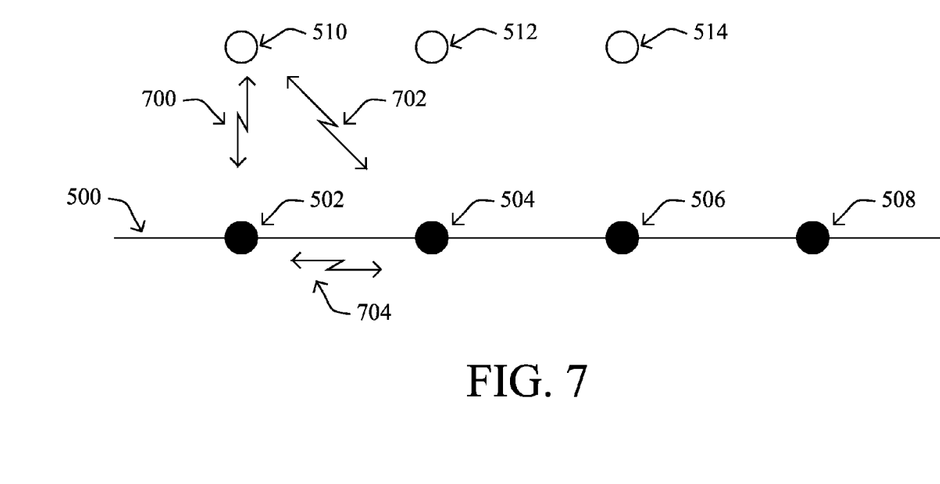
FIG. 7 illustrates an example of a device on the intelligent wire intercepting a communication to a neighbor device.

In some embodiments, network devices 502-508 may be configured to intercept communications intended for a neighbor device and forward messages to the neighbor via intelligent wire 500. In other words, intelligent wire 500 may be used as a series of point-to-point links. Devices along intelligent wire 500 promiscuously listen for wireless packets that are to be received by their left and/or right neighbors on intelligent wire 500 and pipe the packets over intelligent wire 500 to the intended recipient. As a result, the device to the left and the device to the right forward the packets over the wire to the rightful destination in parallel to the reception process (i.e., at the same time the packet is received wirelessly). This multiplies the chances of reception, and the rightful receiver can acknowledge receipt in due time. For example, as shown in FIG. 7, assume that another device 510 attempts to wirelessly communicate a message 700 with network device 502. Network device 504, which is a neighbor device to network device 502, may intercept message 700 (e.g., as intercepted message 702) and forward intercepted message 702 to network device 502 as a wired message 704 over intelligent wire 500. In one embodiment, devices 502, 504 may stay in sync using a common sequence counter/number by communicating over intelligent wire 500. Such a counter may be added to a communication and used by the receiving device to eliminate duplicated packets along the way.

In one embodiment, each AP along intelligent wire 500 monitors the RF of its close neighbors. As the emission power of each AP is reduced to the minimum, a given AP will only have access to the RF traffic from its closest AP neighbors. A threshold power level may be used to control the reception of neighboring communications (e.g., to limit reception to only direct neighbors). The intercepting AP may also use the MAC address of its immediate neighbors as an identifier of the traffic.

As noted above, control over the power consumption of APs along intelligent wire 500 can also enable the network to compensate for a failing network device. For example, if a PCE is used, the PCE will have information that identifies the neighbor(s) of the failing device. The PCE may use this information to request that one or both of the neighbors handle the traffic on behalf of the failing device, using the interception techniques outlined above. For example, if network device 502 is failing, network device 504 may process intercepted message 702 on behalf of network device 502 (i.e., network device 504 may act as if it were network device 502 for purposes of communicating with device 510). In one embodiment, an AP along intelligent wire 500 may transmit a special message to locate other APs, so as to map the grid of intelligent wires and allow the PCE to determine an alternative AP for a failing AP (e.g., a neighbor of the failing AP, an AP on a different wire, etc.).

Figure 8:
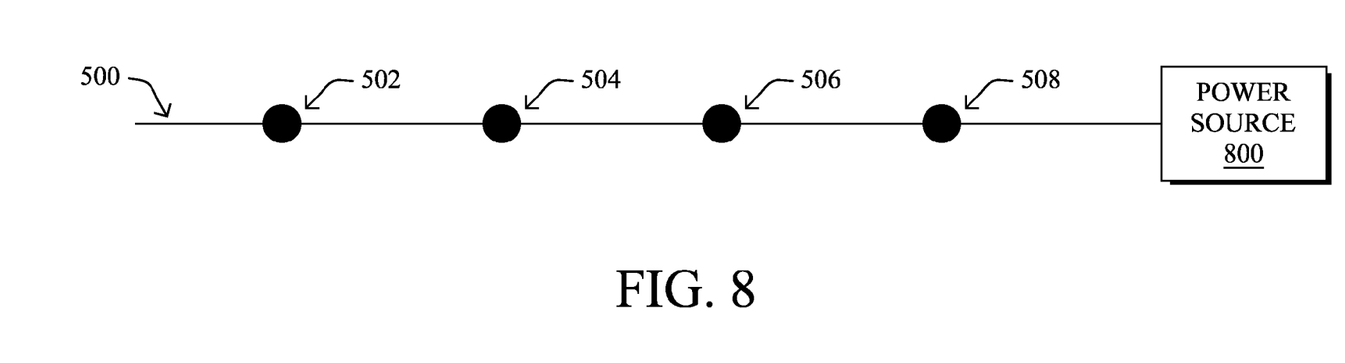
FIG. 8 illustrates an example of the intelligent wire providing power to devices.

An intelligent wire may be configured to provide power to the network devices positioned along the wire. For example, as shown in FIG. 8, a power source 800 coupled to intelligent wire 500 may provide power to network devices 502-508. In one embodiment, intelligent wire 500 comprises one or more a twisted pair cables to carry battery or scavenged power from power source 800 to network devices 502-508. Doing so reduces the amount of batteries to be changed over time for each network device, and federates the power consumption between devices 502-508 on intelligent wire 500. In another embodiment, intelligent wire 500 may use a POE or similar approach to supply network devices 502-508 with power. In a further embodiment, intelligent wire 500 may comprise a separate power cable to supply power to network devices 502-508. Intelligent wire 500 may also be constructed to be watertight and intrinsically safe for use in hazardous zones (e.g., by sealing the wire at the factory).

In some embodiments, intelligent wire 500 does not power devices 502-508. For example, devices 502-508 may be powered wirelessly (e.g., via induction, etc.) and repeat/route radio packets. Doing so may allow devices 502-508 to be sealed within a protective cover on intelligent wire 500 to resist corrosion, outdoor challenges, etc. An example usage is WiFi™ inside trains, planes, as well as in tunnels, as a replacement to the discussed leaky feeder.

Figure 9:
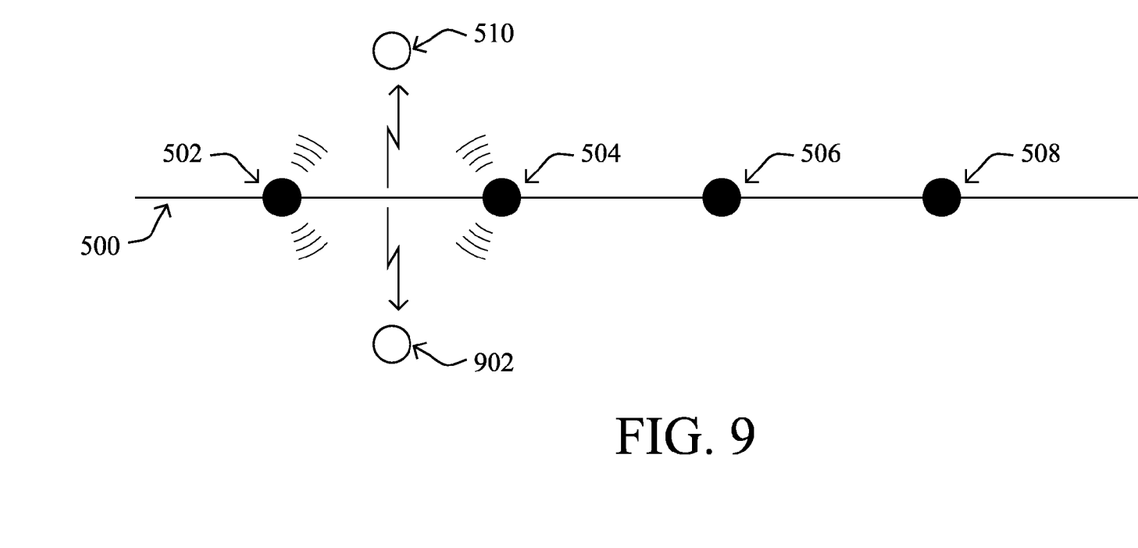
FIG. 9 illustrates an example of sensors along the intelligent wire detecting a remote device.

An intelligent cable may be constructed with passive sensors in addition to, or in lieu of, APs. For example, as shown in FIG. 9, network devices 502-508 may comprise passive sensors that are configured to simply measure energy, recognize patterns, and/or find the locations of devices external to intelligent wire 500. In this configuration, the sensors do not emit RF signals, but instead simply listen on the band (e.g., the ISM band). The matrix of sensors deployed to a physical location allows the location of an energy source to be easily determined. For example, assume that an unknown device 902 attempts to communicate with device 510 in the deployment area. In such a case, network devices 502-504 may detect the direction and signal strength of the communication, allowing the location of unknown device 902 to be determined. In various embodiments, the sensors may be further configured to identify the type of device. For example, network devices 502-504 may identify device 902 as being a WiFi™ device, a TSCH device, a microwave device, etc.

Figure 10:
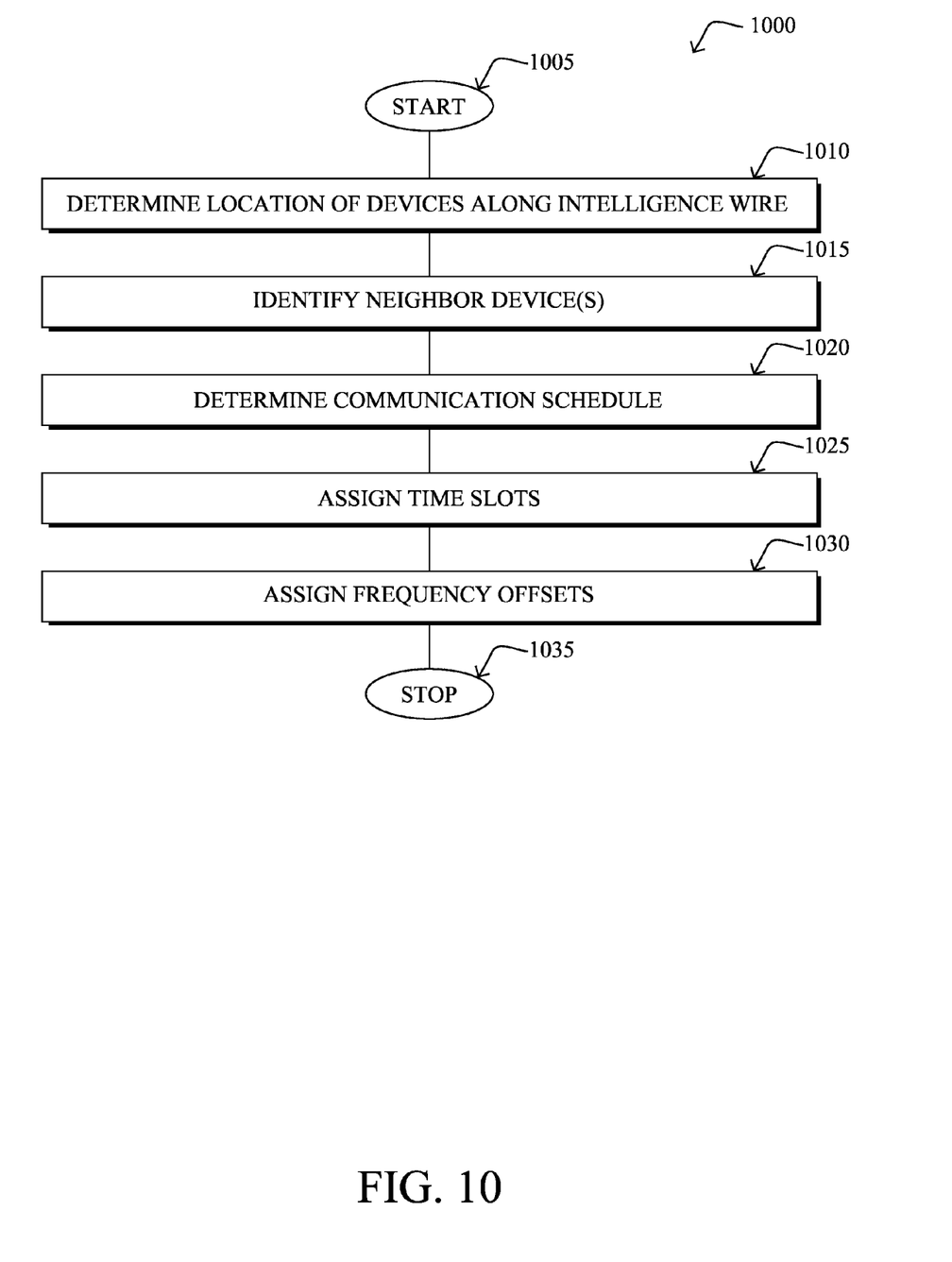
FIG. 10 illustrates an example simplified procedure for assigning a communication schedule to devices along an intelligent wire.

Deployment of passive sensors along an intelligent wire may also enable security measures to be taken within the deployment area. For example, deploying sensors via intelligent wires allows the physical location of unauthorized devices to be detected. These devices may be of any type, such as devices that could be used to launch a malicious attack on the LLN or even devices that are unauthorized in the area via policy (e.g., personal WiFi™, devices that are prohibited from being brought onto the factory floor, etc.). Such device can be profiled, located, and police action may be triggered by conveying the sensor data to a supervisory device FIG. 10 illustrates an example simplified procedure for assigning a communication schedule to devices along an intelligent wire. The procedure 1000 may start at step 1005, and continues to step 1010, where, as described in greater detail above, the locations of network devices along the intelligent wire are determined. As described in greater detail above, the locations of the devices may be computed based on fixed or known distances between the network devices on the intelligent wire and identifiers for the devices (e.g., sequential serial numbers, etc.). The procedure 1000 continues on to step 1015 in which one or more neighbor devices are determined for each network device along the intelligent wire. For example, the neighbor device or devices may be identified using the sequence of device identifiers along the wire. In step 1020, a communication schedule for the network devices along the intelligent wire is determined. In various embodiments, the communication schedule may use a TSCH methodology and be based on the determined neighbors such that neighboring devices are prevented from transmitting on the same frequency. In step 1025, the time slots in the communication schedule are assigned to the network devices. In step 1030, the frequency offsets of the communication schedule are also assigned to the network devices and procedure 1000 ends at step 1035.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide in an LLN. In particular, the intelligent wire disclosed herein allows the location of network devices along the wire to be determined. For deterministic networks, this allows a communication schedule to be generated that takes into account the location of neighboring devices such that neighbors do not transmit on the same frequency. Implementations that utilize a high density of APs or sensors also provide enhanced wireless coverage (e.g., WiFi™, etc.) with lower radio emission. An intelligent wire may also increase location accuracy in the deployed area. Further, the intelligent wire allows for ease of installation since there is no need to position the network devices (e.g., APs, sensors, etc.).

While there have been shown and described illustrative embodiments that provide for intelligent wiring in a shared-media communication network, it is to be understood that various other adaptations and modifications may be made within the spirit and scope of the embodiments herein. For example, the embodiments have been shown and described herein with relation to deterministic wireless networks. However, the embodiments in their broader sense are not as limited, and may, in fact, be used with other types of networks and/or protocols. In addition, while certain protocols are shown, such as RPL and PCE protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, for a plurality of network devices in a low power and lossy network (LLN), locations of the network devices along a physical, intelligent wire, wherein the network devices are embedded in the intelligent wire;
   identifying one or more neighboring devices for each network device in the plurality based on the locations of the network devices along the intelligent wire;
   determining a communication schedule for the network devices that prevents neighboring devices along the intelligent wire from transmitting on the same frequency;
   assigning the network devices to communication time slots based on the communication schedule; and
   assigning frequency offsets to the network devices based on the communication schedule.

2. The method as in claim 1, wherein the network devices along the intelligent wire comprise sensor access points.

3. The method as in claim 1, wherein the network devices along the intelligent wire comprise Wi-Fi access points.

4. The method as in claim 1, wherein the network devices along the intelligent wire comprise light emitting diode (LED) access points.

5. The method as in claim 1, further comprising:
   detecting a faulty network device along the intelligent wire; and
   increasing transmission power of the one or more neighboring devices of the faulty network device.

6. The method as in claim 1, wherein the network devices are located along the intelligent wire at fixed distances from one another.

7. The method as in claim 1, further comprising:
   detecting, at one of the network devices, a wireless transmission sent to a neighboring device of the network device; and
   forwarding the transmission to the neighboring device via the intelligent wire.

8. The method as in claim 1, further comprising:
   supplying power to the network devices using the intelligent wire.

9. The method as in claim 1, wherein at least some of the network devices comprise passive sensors configured to monitor a frequency band, the method further comprising:
   detecting, via the passive sensors, the location of a remote device that is not coupled to the intelligent wire.

10. The method as in claim 9, further comprising:
    determining that the remote device is an unauthorized device.

11. The method as in claim 1, further comprising:
    receiving serial numbers from the network devices, wherein the serial numbers sequentially appear along the intelligent wire; and
    using the serial numbers to determine the locations of the network devices and the intelligent wire.

12. An apparatus, comprising:
    one or more network interfaces to communicate with low power and lossy network (LLN) devices located along an intelligent wire, wherein the network devices are embedded in the intelligent wire;
    a processor coupled to the network interfaces and adapted to execute one or more processes; and
    a memory configured to store a process executable by the processor, the process when executed operable to:
       determine, for the LLN devices, locations of the devices along the intelligent wire;
       identify one or more neighboring devices for each LLN device based on the locations of the devices along the intelligent wire;
       determine a communication schedule for the LLN devices that prevents neighboring devices along the intelligent wire from transmitting on the same frequency;
       assign the LLN devices to communication time slots based on the communication schedule; and
       assign frequency offsets to the LLN devices based on the communication schedule.

13. The apparatus as in claim 12, wherein the process when executed is further operable to:
    detect a faulty network device along the intelligent wire; and
    increase transmission power of the one or more neighboring devices of the faulty network device.

14. The apparatus as in claim 12, wherein the network devices are located along the intelligent wire at fixed distances from one another.

15. The apparatus as in claim 12, wherein the process when executed is further operable to:
    detect, at one of the LLN devices, a wireless transmission sent to a neighboring device of the LLN device; and
    forward the transmission to the neighboring device via the intelligent wire.

16. The apparatus as in claim 12, further comprising:
    a power supply configured to power to the network devices using the intelligent wire.

17. The apparatus as in claim 12, wherein at least some of the network devices comprise passive sensors configured to monitor a frequency band, and wherein the process when executed is further operable to:
    detect, via the passive sensors, the location of a remote device that is not coupled to the intelligent wire.

18. The apparatus as in claim 17, wherein the process when executed is further operable to:
    determine that the remote device is an unauthorized device.

19. The apparatus as in claim 12, wherein the process when executed is further operable to:
    receive serial numbers from the network devices, wherein the serial numbers Sequentially appear along the intelligent wire; and
    use the serial numbers to determine the locations of the network devices and the intelligent wire.

20. An apparatus comprising:
    a physical, intelligent wire; and
    low power and lossy network (LLN) devices located along the intelligent wire at fixed distances from one another, wherein the devices are embedded in the intelligent wire.

21. The apparatus as in claim 20, wherein the intelligent wire is configured to provide a communication medium between the LLN devices located along the intelligent wire.

22. The apparatus as in claim 20, wherein the LLN devices are selected from a group comprising: wireless access points and sensors.

23. The apparatus as in claim 20, wherein the intelligent wire is configured to power the LLN devices.

\* \* \* \* \*